United States Patent [19]
Jones et al.

[11] 4,456,809
[45] * Jun. 26, 1984

[54] MICROPROCESSOR-CONTROLLED CONTROLLER FOR RESISTANCE WELDING MACHINES

[75] Inventors: Gary A. Jones, Chatsworth, Calif.; David C. Bacon, Clawson, Mich.; Monte A. Pooley, Newbury Park, Calif.

[73] Assignee: Pertron Controls Corporation, Canoga Park, Calif.

[*] Notice: The portion of the term of this patent subsequent to Nov. 17, 1998 has been disclaimed.

[21] Appl. No.: 361,820

[22] Filed: Mar. 25, 1982

[51] Int. Cl.³ .............................................. B23K 11/24
[52] U.S. Cl. .................................... 219/108; 219/114
[58] Field of Search ....................... 219/108, 110, 109; 323/326; 364/477

[56] References Cited

U.S. PATENT DOCUMENTS 4,039,928 8/1977 Noftsker et al. .................... 323/326
4,301,351 11/1981 Mathews ............................. 219/110
4,317,980 3/1982 Goodrich et al. .................. 219/108

Primary Examiner—C. C. Shaw
Attorney, Agent, or Firm—Keith D. Beecher

[57] ABSTRACT

A precision key pad controlled controller for a resistance welding machine is provided which may be set to deliver welding power to each of a multiplicity of welding operations on a precisely controlled repeatable basis. The controller incorporates circuitry for assuring that an accurately controlled amount of power is delivered for each welding operation by providing precise phase angle control despite variations in line voltage and line disturbances. The controller is constructed to incorporate selected numbers of steps to be performed automatically in sequence by the controlled welding machine in carrying out a particular welding operation. The duration of each step of the welding machine, the amount of welding power to be delivered, and other parameters are set for each particular welding operation by the key pad, and displayed on an associated alphanumeric display.

3 Claims, 10 Drawing Figures

A ┌─────────────────────────────────────┐
  │      ENTER SCHEDULE NUMBER          │
  └─────────────────────────────────────┘

MODE  SCHEDULE NO.
                    INSTRUCTION NO.
B ┌─────────────────────────────────────┐
  │   A   0=00   BEGINNING OF PROGRAM   │
  └─────────────────────────────────────┘

SQUEEZE TIME              VALVE TO APPLY SQUEEZE
           (ENTERED IN NUMBER MODE)    (ENTERED IN NUMBER MODE)
C1 ┌────────────────────────────────────┐
   │  A  0=01   00*  SQUEEZE <VALVE=01> │
   └────────────────────────────────────┘

SLOPE TIME   BEGINNING HEAT    ENDING HEAT
C2 ┌────────────────────────────────────┐
   │  A  0=02   00*  SLOPE FROM 00% TO 00% │
   └────────────────────────────────────┘

WELD TIME    WELD HEAT
C3 ┌────────────────────────────────────┐
   │  A  0=03   00*  WELD AT 00%        │
   └────────────────────────────────────┘

C4 ┌────────────────────────────────────┐
   │  A  0=04   00*  SLOPE FROM 00% TO 00% │
   └────────────────────────────────────┘

HOLD TIME
C5 ┌────────────────────────────────────┐
   │  A  0=05   00*  HOLD               │
   └────────────────────────────────────┘

FIG. 3A

D — ENTER SCHEDULE NUMBER

E — F 0=00 BEGINNING OF PROGRAM

F1 — F 0=01 00* SQUEEZE <VALVE=01>

F2 — F 0=01 25* SQUEEZE <VALVE=02>

G1 — F 0=02 00* SLOPE FROM 00% TO 00%

G2 — F 0=02 20* SLOPE FROM 10% TO 30%

H1 — F 0=03 00* WELD AT 00%

FIG. 3B

H2    F  0=03  40*  WELD AT 50%

I1    F  0=04  00*  SLOPE FROM 00% TO 00%

I2    F  0=04  10*  SLOPE FROM 50% TO 10%

J1    F  0=05  00*  HOLD

J2    F  0=05  30*  HOLD

FIG. 3c

MICROPROCESSOR-CONTROLLED CONTROLLER FOR RESISTANCE WELDING MACHINES

BACKGROUND OF THE INVENTION

Resistance welding processes are widely used in the manufacture of sheet metal assemblies, such as automobile and aircraft bodies. Each resistance weld involves a sequence of electrical energy and mechanical pressure steps. The sequence is provided usually by a microprocessor-controlled controller which governs the timing of both the electrical and mechanical steps, and the amount of power to be delivered to the weld during the electrical steps. For example, the controller may establish a selected number of cycles of alternating current power at a selected current, with a selected electrode force for each step of the welding process. In carrying out the welding process, the operator merely presses a button which sets the controller in operation. The controller then responds to an internal program to carry out all the steps necessary for the welding operation. The program for the controller is stored in an internal memory, and it may vary from a relatively few commands to a large number of commands, depending on the simplicity of complexity of the welding operation. A typical microprocessor-controlled controller for resistance type welding machines is disclosed, for example, in U.S. Pat. No. 4,301,351, Mathews, which is assigned to the present assignee.

The controller disclosed in the Mathews patent is controlled by a microprocessor which has programmable read-only memories and random access memories associated therewith. The controller of the patent provides head and pressure commands to the controlled resistance welding machine; and it includes a digital circuit for compensating for line voltage variations and disturbances which digitizes the RMS input voltage and computes the proper firing time to maintain constant power during line voltage fluctuations and disturbances. The firing times are controlled by silicon controlled rectifiers or ignitrons, as described in the patent.

Over-temperature protection of the switching elements in the controller may be provided in the manner disclosed and claimed in U.S. Pat. No. 4,039,928, which also is assigned to the present assignee.

The welding machine to be controlled of the present invention by the controller includes two electrodes which are squeezed in response to commands from the controller against the opposite sides of the workpiece, and an electric current is then passed through the electrodes and through the workpiece to form the weld. The movement of the electrodes and the current through the electrodes are controlled by the controller of the invention. The controller may be set up by the key pad automatically to control for each welding operation the number of cycles of current to flow during the time interval in which the electrodes are squeezed against the opposite sides of the workpiece; the number of current cycles prior to the initiation of the weld; the number of current cycles as the weld is being formed; the number of current cycles during a hold operation; and the number of current cycles for which an "off" condition is to occur between successive welding operations.

The controller of the present invention may also be set up by the key pad automatically to control the amount of power to be delivered before (PRE-SLOPE), during and after (POST-SLOPE) the weld, for each welding operation. Power is linearly increased during the "pre-slope" interval; is held constant during the weld interval; and is linearly decreased during the "post-slope" interval.

SUMMARY OF THE INVENTION

The system of the invention provides a microprocessor control system for a single phase welding machine which, like the system of U.S. Pat. No. 4,301,351 incorporates automatic line voltage compensation to maintain constant tip heat in the welding machine even in the presence of line voltage fluctuations. The system of the invention includes a key pad and an alphanumeric display of the light emitting diode (LED) type, so that the operator of the system can easily and directly alter the time and heat parameters of the standard weld program which is installed into the system at the factory, or modify the program to fit his own particular requirements. The system also incorporates power factor correction, a built-in self-test and diagnostics sub-system, and a short-circuit and over-temperature protection circuit for the solid state switches, to insure that the system will perform consistently, reliably and safely over long periods of operational use.

BRIEF DESCRIPTION OF THE DRAWINGS

FIGS. 3A, 3B and 3C are representations of different data which appear on the display as a weld schedule is being set up by the operator;

DETAILED DESCRIPTION OF THE ILLUSTRATED EMBODIMENT

Figure 1:
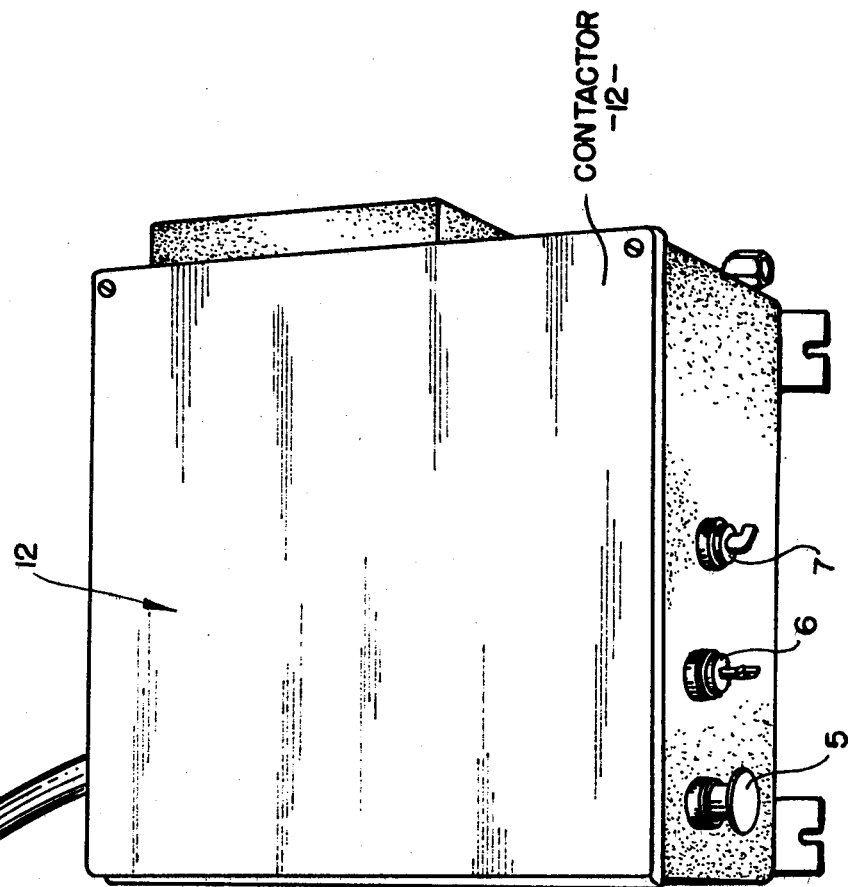
FIG. 1 is a front view of a controller unit and a connector unit which incorporate the system of the invention, and which are interconnected by a single cable.
Figure 1:
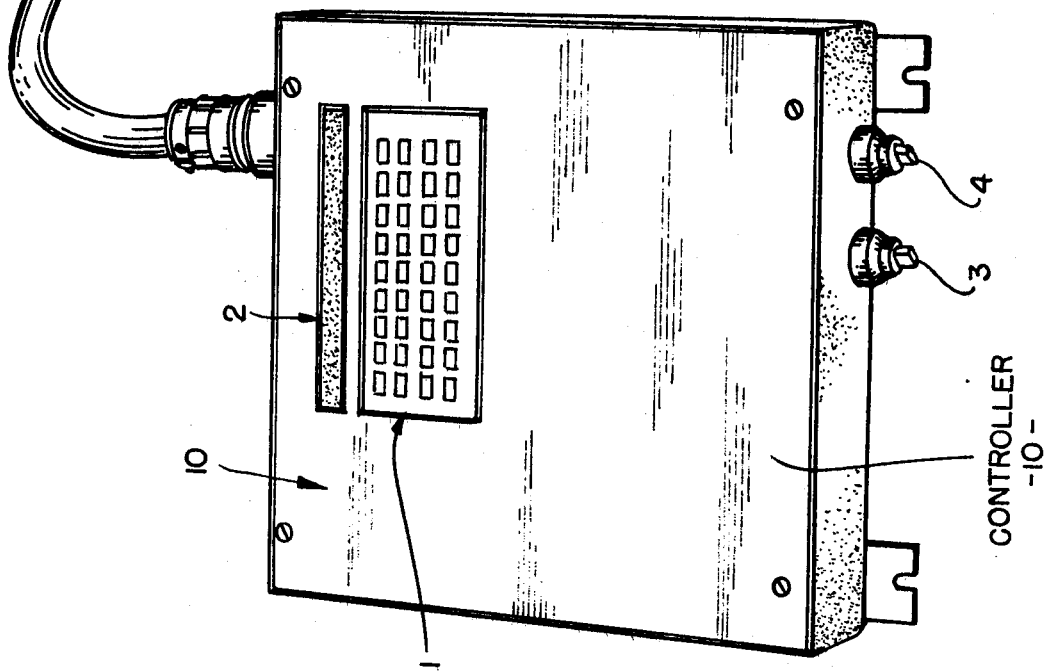

The system of the invention, as shown in FIG. 1, includes a controller unit 10 and a contactor unit 12, interconnected by a single cable. The controller unit 10 includes microprocessor controlled circuitry which is shown in circuit detail in FIGS. 4, 5 and 6. A data entry key pad 1 is mounted on the front panel of the controller unit, the key pad being shown in an enlarged scale in FIG. 2. The data entry key pad 1 enables the operator to enter a weld program for the controller unit containing, for example, up to ten individual weld schedules. The key pad 1 also enables the operator to enter nominal line voltages and heat stepping values into the system; and it also enables the operator to execute self-test diagnostic procedures and the display of the programmable functions.

The controller unit 10 also includes an alphanumeric LED display 2. This display indicates the existing weld program, the nominal line voltage, the heat stepping value, the continuous weld operations, and self-test diagnostic status. The controller unit 10 also includes a Weld/No-Weld selector switch 3. When this switch is placed in the WELD position, the system is fully operational, and the weld program may be executed upon command. When switch 3 is placed in the NO-WELD position, the system is fully operational, except that it is not enabled to cause the welding machine to pass weld current. The controller unit 10 also includes a SINGLE/REPEAT selector switch 4. When selector switch 4 is placed in the SINGLE position, a weld command is executed once. When the switch is placed in its REPEAT position, the weld command is executed as long as the INITIATE signal for the weld command remains on.

The controller unit 10 is connected by cable to a contactor unit 12. The contactor unit includes a contactor, contactor interface circuitry (FIG. 7) and certain control and interface transformers. An EMERGENCY STOP pushbutton switch 5 is mounted on the contactor unit, and when this pushbutton switch is actuated, a shunt trip circuit is energized which stops the execution of the entered weld program. The contactor unit 12 also includes an OVERRIDE OFF/ON shunt trip selector key switch 6. When key switch 6 is turned to the OVERRIDE-ON position, it disables the contactor door interlock switch and the EMERGENCY STOP pushbutton switch. The key cannot be removed when the switch 6 is in the OVERRIDE-ON. The contactor unit also includes a VALVES OFF/ON selector switch 7. When the switch 7 is placed in the VALVES-ON position, it enables activation of external valves during weld operation. When the switch is placed in the VALVES-OFF position, it de-activates the external valves.

The primary function of the controller unit 10 is to control the current supplied by the contactor unit 12 to the welding machine. The controller unit 10 includes a number of major functional components which are shown in block form in FIG. 1A, and which will be subsequently described in detail. These components are: a microprocessor circuit 50, a memory 52, key pad interface logic circuitry 53, an input data register 54, an output data register 56, weld enable/fire logic circuitry 58, and data communication port logic circuitry 60. Together these components provide the following functions: entry or modification of weld schedule; execution control of existing weld programs; entry of nominal line voltage and heat stepping values; display of current weld program; on-line monitoring of weld operations, including cumulative number of welds, actual line voltage, and heat stepping percentage currently operative; and continuous diagnostic plus self-test displays to verify operational status.

The microprocessor circuit 50 issues all the timing and control signals necessary for weld program execution and display and monitoring functions. Data is transferred in parallel to and from the microprocessor on a common 8-bit bidirectional data bus. Timing is controlled by a 4 MHz clock input to microprocessor 50 from a crystal-controlled clock generator oscillator 62. The microprocessor 50 responds to a factory-installed, non-alterable program to accept, store and execute weld schedules. This program also contains display, continuous diagnostics, and self-test functions.

Memory 52 consists of a programmable read-only memory (PROM) 52A and a random access memory (RAM) 52B. The PROM 52A contains the factory-installed, non-alterable program which is permanent and cannot be erased by removal of power. The microprocessor 50 reads the instructions stored in the PROM, one at a time, and controls weld operations based upon user-entered data, the settings of controller unit and of the contactor unit switches, and user-supplied initiate inputs. Data stored in the RAM is alterable and consists of the factory-programmed standard weld schedules and user-entered data including, for example, schedule modifications, time and heat parameters, and the like. A long-life battery prevents erasure of this data from the RAM when power is removed, as will be described.

Data and command entries are fed into the microprocessor 50 by way of key pad 2, and key pad interface circuitry 53. When the user presses a key, or combination of keys, on key pad 2, the microprocessor services the key pad. If a mode change command is entered on the key pad, the microprocessor issues appropriate timing and control signals to enter the desired mode. If schedule data is entered on the key pad, the microprocessor writes the data into the RAM 52B, and it also transmits the data to the alphanumeric LED display 1. If a display read-out is requested, the microprocessor reads the desired data stored in the RAM 52B and routes it to the display 1.

The user-generated INITIATE and RETRACT inputs to the contactor unit 12 are buffered, routed to the controller unit 10, and stored in the input data register 54. The contents of register 54 are then fed to microprocessor circuit 50 which executes the initiate or retract function. Other inputs to the input data register 54 are NO WELD-WELD, SINGLE-REPEAT, and VALVES OFF/ON control signals generated by their respective switches 3, 4, 7. A WELD control signal enables the microprocessor FIRE COMMAND signal when an INITIATE input is received. A NO-WELD control signal inhibits the microprocessor FIRE COMMAND signal regardless of an INITIATE input. A SINGLE control signal permits the microprocessor to issue one FIRE COMMAND signal per INITIATE input.

A REPEAT control signal directs the microprocessor to issue repetitive FIRE COMMAND signals, separated by specific time intervals, for the duration of the INITIATE input. A VALVES OFF control signal inhibits microprocessor circuit 50 from activating external valves by way of the user output signals. A VALVES ON control signal directs the microprocessor to select and activate external valves as they occur in the weld program. The OVERTEMP and CONTACTOR OFF signals are generated in the contactor unit, and will be described subsequently.

In response to INITIATE and RETRACT inputs, microprocessor-issued user outputs are placed on the data bus and loaded into the output data register 56 at appropriate times during execution of a weld program. The contents of the output data register are routed to the contactor 12, buffered, and are fed to the welding machine to activate one of four possible valves or to cause a tip retraction in the event of power removal. The WELD ENABLE/FIRE logic circuitry 58 interfaces microprocessor 50 with control logic circuitry in contactor 12. The WELD ENABLE/ FIRE logic circuitry generates an ENABLE signal which guards against unintentional triggering of the contactor 12. This signal must be present when a FIRE COMMAND signal is received by the contactor unit, or the welding machine will not be fired.

The data communication port logic circuitry 60 interfaces the system with external data gathering and/or control equipment for the transfer to such equipment of data such as: fault indications; schedule up-load and down-load; on-line weld operations monitoring; on-site data gathering and concentration. When a compatible external device is used, the data communication port logic circuitry 60 recognizes requests to send data from microprocessor circuit 50, or to receive data from an external device. The data communication logic circuitry 60 provides proper handshake signals and insures compatible transfer of data. Data sent to an external device is furnished to the port from RAM 52B under microprocessor control. Data received is stored in RAM 52B, likewise under microprocessor control.

Figure 1A:
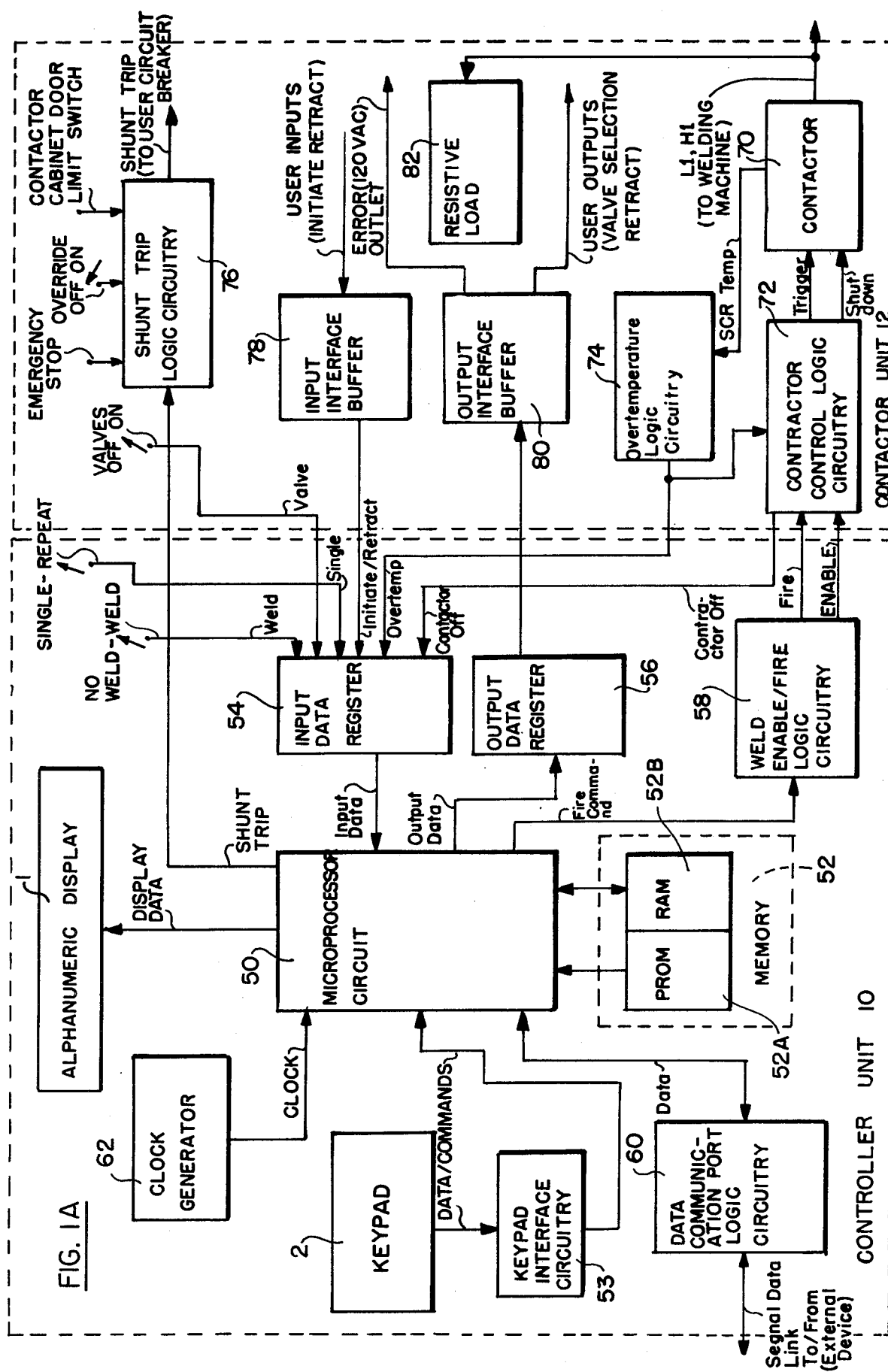
FIG. 1A is a block diagram of the system of the invention in one of its embodiments, which is incorporated into the controller unit and contactor unit of FIG. 1.

The contactor unit 12 contains a number of major functional components which are shown in block form in FIG. 1A. These include a contactor 70, contactor control logic circuitry 72, over-temperature logic circuitry 74, shunt trip circuitry 76, an input buffer interface circuit 78, and an output buffer interface circuit 80. Together these components provide the following functions for the system: application of current to the controlled welding machine under microprocessor control; interface and buffering of user inputs and outputs; monitoring of SCR temperature and shut-down on over-temperature; and shunt trip control.

The contactor unit 12 is connected to the welding machine current source which may, for example, supply 480 volt (nominal) single phase power. On receipt of an INITIATE signal, and under microprocessor control, the power is applied through the contactor 70 to the welding machine. Contactor 70, in the embodiment to be described, contains two water cooled silicon controlled rectifiers (SCR) rated at 1200 amps and 1700 volts. These SCR's open or close one power line of the welding machine. When the contactor 70 is triggered, current flows through the SCR's to the welding machine. A resistive load is placed across the contactor outputs (L1, H1) to provide surge and transient protection, as well as transient suppression.

The contactor also transmits an SCR TEMP signal to the over-temperature logic circuitry 74. If an SCR overtemperature condition exists, shut down occurs within one-half cycle of over-temperature detection. The over-temperature logic circuitry 74 monitors contactor temperature by electrical measurement of the gate and cathode of each SCR. Factors which can cause an over-temperature condition, and subsequent SCR thermal destruction, are excessive current, high coolant temperature, low coolant flow, or a combination of these factors. The over-temperature logic circuitry 74 senses this condition, and immediately issues an OVER TEMP signal to the contactor logic circuitry 72 which turns off the contactor 70. The OVER TEMP signal is also sent to the microprocessor 50 which generates an error output signal to activate an appropriate alarm unit.

The shunt logic circuitry 76 trips an external shunt to disconnect the contactor outputs (L1, H1) from the welding machine if any of the following conditions occur: the EMERGENCY STOP pushbutton 5 on the contactor is actuated; the contactor cabinet door is opened; or contactor outputs (L1, H1) are short-circuited. Should the latter condition occur, the microprocessor 50 generates the SHUNT TRIP at ERROR output signals.

Output buffer interface circuitry 80 converts the digital output from the microprocessor into corresponding analog signals for valve activation and welder tip retraction functions, as designated by the resistive load block 82. The input buffer interface circuitry 78 converts the user-generated INITIATE and RETRACT analog signals into corresponding digital signals.

An ERROR OUTPUT outlet is located on the cabinet of contactor 12. Under microprocessor control, a 120 VAC ERROR signal will appear at this outlet when any of the following conditions occur: the contactor 70 fails to fire; over-temperature is sensed in the contactor; the contactor is short-circuited. The last condition will cause an external shunt to trip. If the external shunt is operative the legend SCR SHORTED will appear on the display 2 on the controller front panel.

Figure 2:
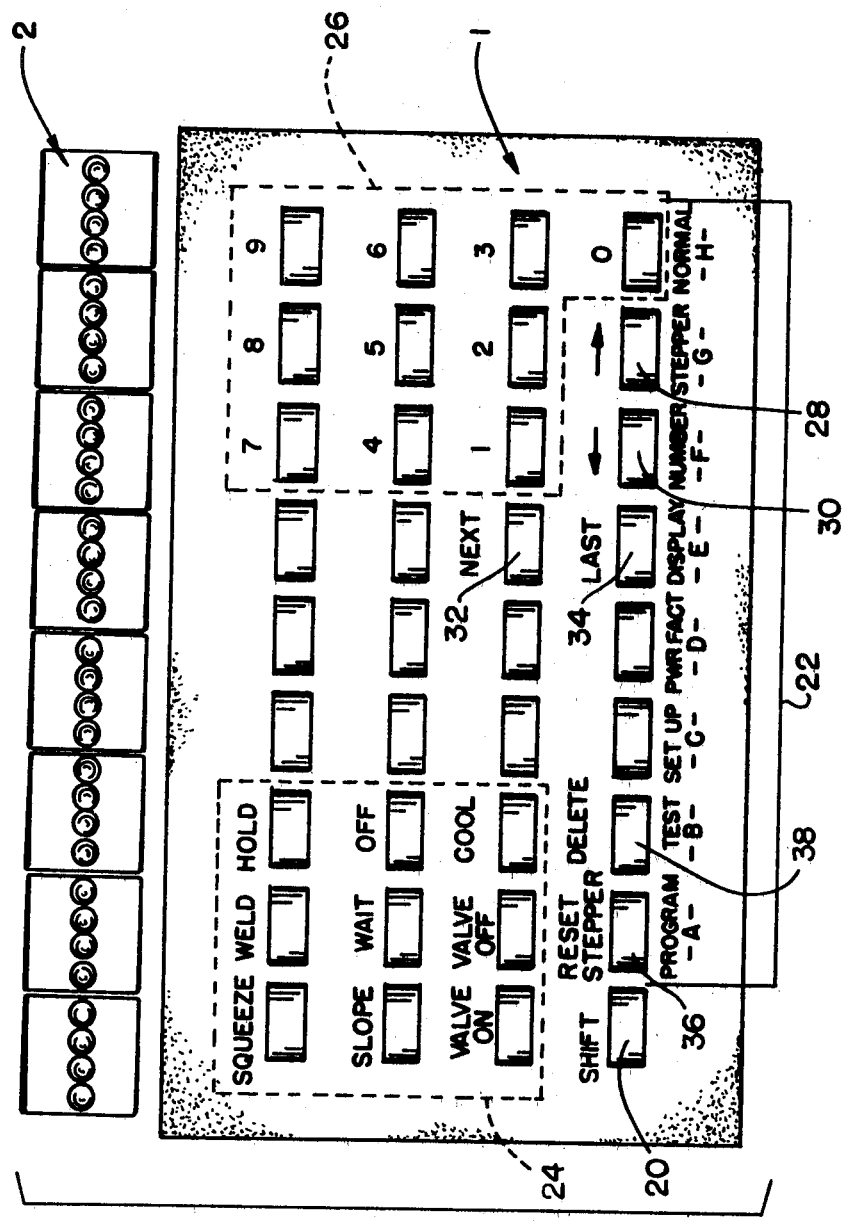
FIG. 2 is an enlarged front view of a key pad and display which are mounted on the front panel of the control unit of FIG. 1.

The key pad and display units 1 and 2 are shown in more detail in FIG. 2. As shown in FIG. 1, these units are accessible through the front cover of the controller cabinet. The key pad provides a means for entering a weld program consisting of up to ten individual weld schedules. Nominal line voltage and heat stepping values can also be entered. During weld operation, the display 2 continuously shows the cumulative number of welds performed, the actual line voltage, and heat stepping currently operative. The current weld program may also be displayed by the display 2 at any time for review. A built-in self-test diagnostic program can also be performed by the key pad 1 to verify the system operational status. The read-out of the alphanumeric LED display 2 is in plain English for all programming, self-test and display functions.

The key pad 1, as shown in FIG. 2, includes a key 20 designated "shift", and a number of keys 22 which are the mode keys. The "shift" key 20 is pressed simultaneously with the applicable mode key 22 to enter the selected mode. The mode keys 22 when used together with "shift" key 20 permit the entry of the following modes: program (a), test (b), set-up (c), power factor (d), display (e), number (f), stepper (g), and normal (h).

The key pad 1 also includes a number of instruction keys designated 24, these keys being used in the Program Mode to set up individual weld schedules as follows: PRESS THE SQUEEZE key to enter a squeeze instruction; PRESS THE WELD key to enter a weld instruction; PRESS THE HOLD key to enter a hold instruction; PRESS THE SLOPE key to enter a pre- or post-slope instruction; PRESS THE WAIT key to enter a wait instruction; PRESS THE OFF key to enter an off instruction; PRESS THE VALVE ON key to enter a valve on instruction; PRESS THE VALVE OFF key to enter a valve off instruction; and PRESS THE COOL key to enter a cool instruction.

The key pad also includes a series of number keys (0-9) 26. When in the number mode, the applicable number keys are pressed to enter the weld schedule number within a weld program, and to enter time, heat parameters and valve numbers. The F and G keys perform dual functions in that they may be pressed alone, without the simultaneous pressing of the "shift" button 20. When key G (28) is pressed alone, in the stepper, set-up and number modes, it serves to move a cursor (flashing digit) to the right. Likewise, when key 30 is pressed in the set-up, and number modes, it serves to move the cursor to the left.

Key 32, when pressed, causes the next sequential instruction within a selected weld schedule to be displayed by display 2; and key 34, when depressed, causes the prior instruction within a selected weld schedule to be displayed. When key 36 is depressed, without simultaneously depressing the shift key 20, it serves to clear the weld count used in heat stepping; and when key 38 is pressed, it serves to delete the displayed weld instruction within a schedule.

As described above, the operator presses the shift key 20 and program key A to enter the program mode. This mode is used to modify the standard weld schedules that are programmed into the controller at the factory. In most applications this mode will not be used. The instruction keys 24 are used sequentially to enter the instructions for a given schedule. The maximum number of instructions possible in each schedule is typically 40, with the exact number depending upon which instructions are used. Once a schedule or program has been completed, the number mode is used to enter time and heat parameters for the instruction sequence. The program mode is used in conjunction with the delete key 38 to erase or modify an existing program.

To enter the test mode, the operator presses the shift key 20 and the test key B. This mode is used to run the built-in self-test diagnostic program, which can even be initiated during weld operations. Three separate tests are performed in a constructed embodiment of the invention, with each test running continuously until the operator halts it or asks for the next test by pressing the next key 32. The first test is automatic and verifies that the microprocessor is operating properly. The number of successful test passes are displayed by the display 2. The second test requires operator response, and tests the key pad 1. During the test, each key is pressed, and the display 2 is used to verify the proper key operation. The third test checks the ten possible weld initiate inputs, and those are recognized and displayed. The no weld-weld switch 3 and the single-repeat switch 4 of FIG. 1 may be tested manually at this time.

To establish the set-up mode, the operator presses the shift key 20 and the set-up key C. At the time of installation, this mode is used to enter nominal line voltage, and this number is used as a reference within the controller to compensate for line voltage variations during operation. Likewise, to establish the power factor mode, the operator presses the shift key 20 and the power factor key D, and this mode permits the system to calculate the power factor at the time of installation.

To enter the display mode, the operator presses the shift key 20 and the display key E. This mode allows the weld program schedules to be reviewed and checked without danger of accidental modification. Any particular schedule may be displayed by entering its number, and by using the NEXT and LAST keys to sequence through the instructions.

To enter the number mode, the operator presses the shift key 20 and the number key F. Keys 0 through 9 are now used to enter time and heat parameters for the existing program, or for a new program. Characters displayed by display 1 which are preceded by an * require a time entry. All time entries are made in cycles, with one cycle being equal to 1/60th of a second. Time entries may be made from 0-99 cycles. Heat entries are entered as percentages and may be made from 0-99%.

To enter the stepper mode, the operator presses the shift key 20 and stepper key G. This mode permits three heat stepping parameters to be specified.

To enter the normal mode, the operator presses the shift key 20 and the normal key H. This is the normal "running" mode for weld operations, during which the actually measured line voltage, weld current and current heat stepping percentage are displayed and updated continuously.

A weld schedule may be set up in the machine as follows, with the appropriate displays appearing on the display 2, as shown in FIGS. 3A, 3B and 3C.

The first operation is simultaneously to press the shift key 20 and program key A which will result in display A of FIG. 3A. The next step is to enter the schedule number (0 to 9). For example, to enter schedule 0, the 0 key is pressed, and the display will be as shown at B in FIG. 3A.

The existing schedule is then erased by first pressing the NEXT key 32, and then repeatedly pressing the DELETE key 38 until the entire schedule is erased. The new schedule is then entered by sequentially operating the instruction keys. For example, the keys may be operated in order as follows:

1. The squeeze key is pressed to produce the display C1 of FIG. 3A;
2. The SLOPE key is pressed to produce the display C2 of FIG. 3A;
3. The WELD key is pressed to produce the display C3 of FIG. 3A;
4. The SLOPE key is pressed to produce the display C4 of FIG. 3A; and
5. The HOLD key is pressed to produce the display C5 of FIG. 3A.

Figure 4:
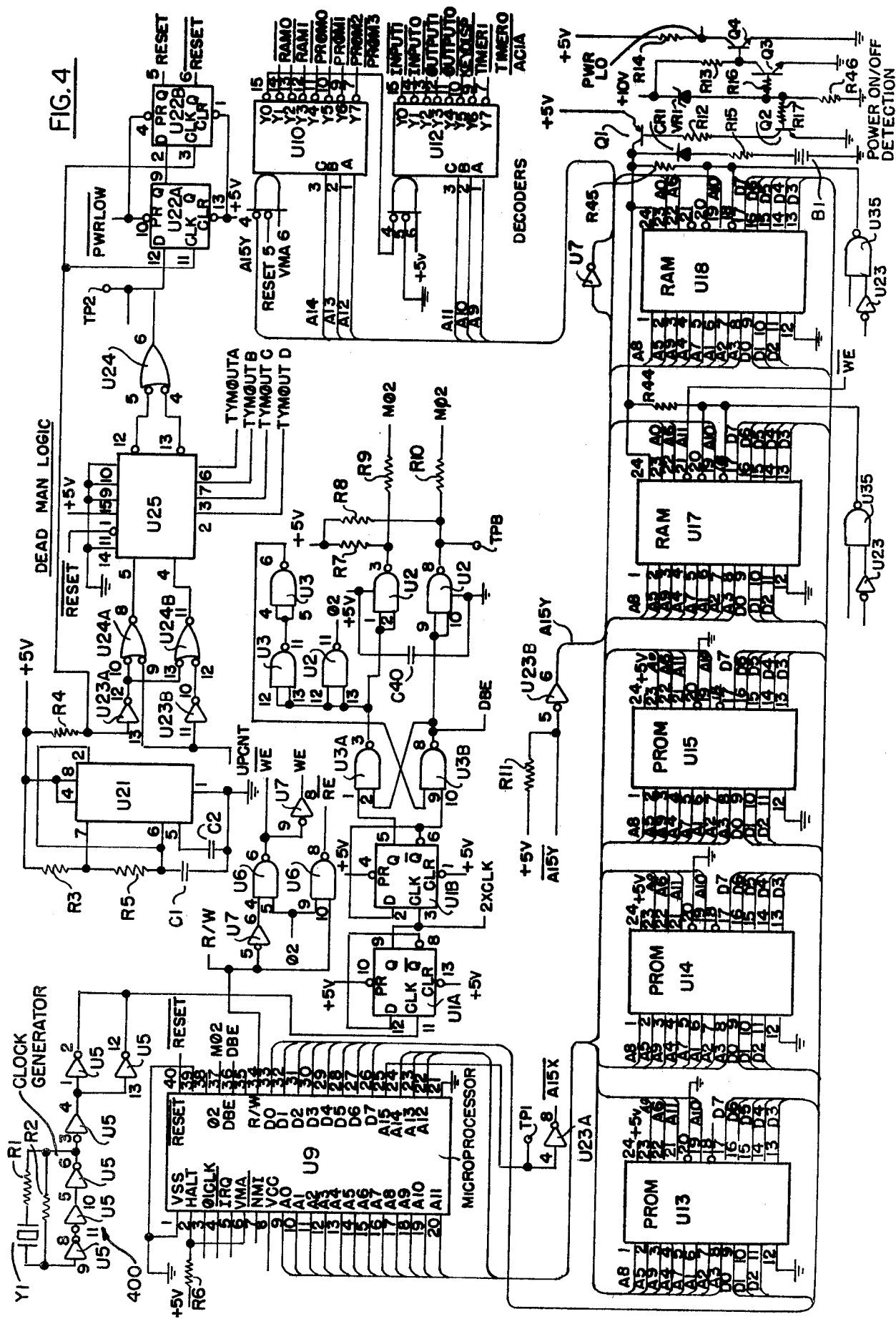
FIGS. 4, 5 and 6 are logic diagrams of the portion of the system of the invention which is included in the controller unit of FIG. 1.

Now, the shift key 20 and number key 30 are depressed to produce the display D of FIG. 4. The schedule number is then entered. For example, to enter schedule 0, the 0 key is depressed to produce the display E of FIG. 4. The NEXT key 32 is then pressed sequentially to enter time and heat parameters for each instruction. A flashing character indicates the first entry for each parameter, and this character ceases flashing when the entry is made. For example, when the NEXT key 32 is pressed, the display will be F1 of FIG. 3B. To enter 25 cycles squeeze, valve 02, keys 2, 5, 0 and 2 are pressed to produce the display F2 of FIG. 3B.

The NEXT key is then pressed to produce the display G1 of FIG. 3B. To enter, for example, 20 cycles slope, 10% to 30%, keys 2, 0, 1, 0, 3 and 0 are pressed, which produces the display G2 of FIG. 3B. The NEXT key is then pressed to produce the display H1 of FIG. 3B. To enter 40 cycles weld at 50%, keys 4, 0, 5 and 0 are pressed to produce the display H2 of FIG. 3C. The NEXT key 32 is then pressed to produce the display I1 of FIG. 3C. To enter 10 cycles slope, 50% to 10%, keys 1, 0, 5, 0, 1 and 0 are pressed to produce the display I2 of FIG. 3C. The NEXT key 32 is then pressed to produce the display J1 of FIG. 3C. To enter 30 cycles hold, keys 3 and 0 are pressed, which results in the display J2 of FIG. 3C.

The foregoing steps are repeated for each schedule to be established or modified. If desired, the established weld program may be checked in the Display Mode in the manner described above. The shift key 20 and normal key H are then pressed simultaneously, and the weld program will now execute on an initiate command from the welding machine.

Normally, the machine is shipped from the factory with a weld program suitable for most welding operations and, under such conditions, it is then necessary for the customer to enter only his particular time and heat parameters. This is carried out in the number mode, by the operations described above. The switch 3 of FIG. 1 is then set to the WELD position, and the switch 4 is set to the desired position. The override switch 6 is set OFF, and the valves switch 7 is set ON. The system is now ready for normal operation.

Figure 5:
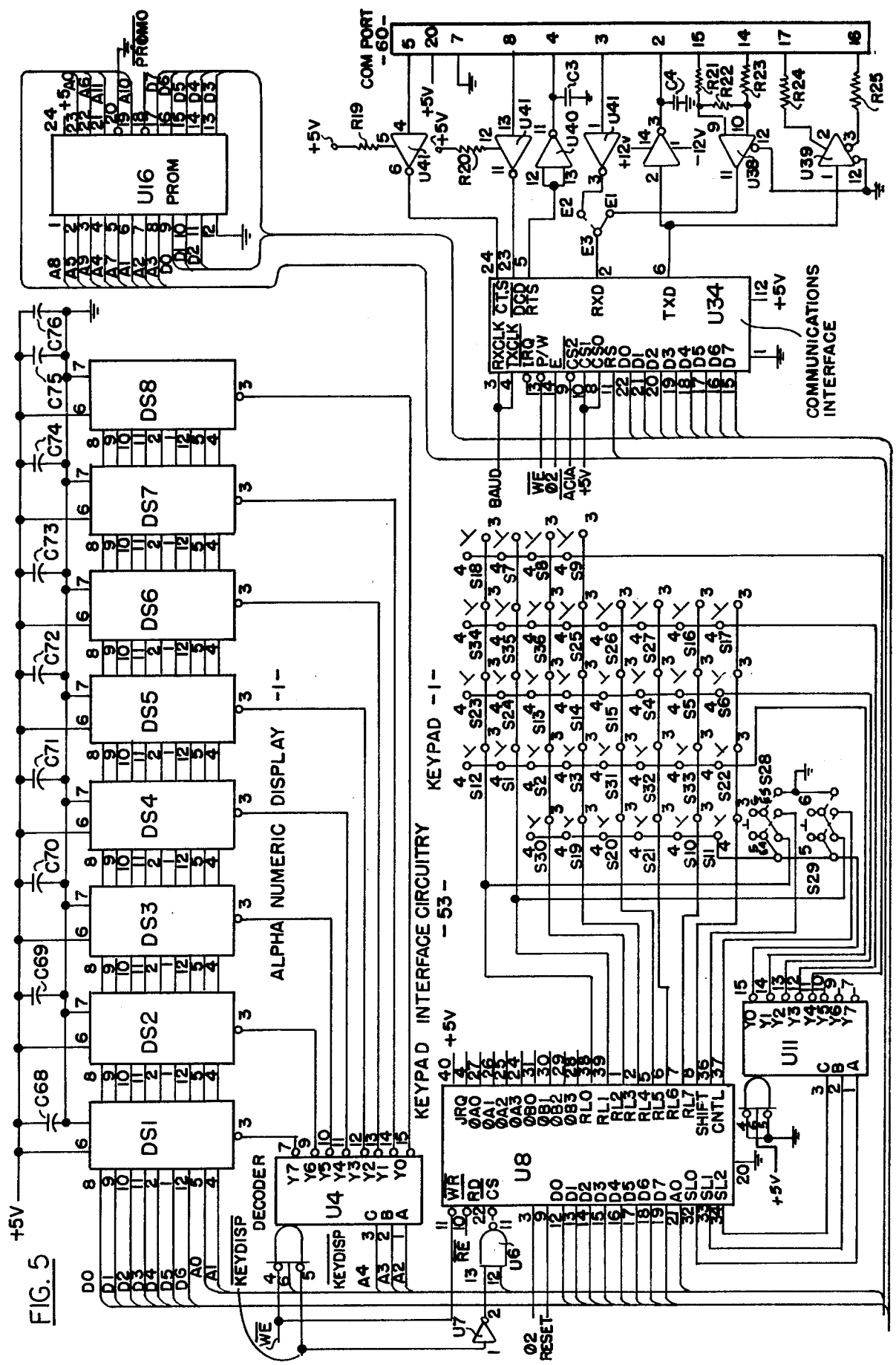

The microprocessor circuit 50 and memory 52 are shown in logic detail in FIG. 4. The memory includes three PROM's in FIG. 4 designated U13, U14 and U15, and an additional PROM U16 which, because of space restrictions is shown in FIG. 5. The memory also includes two RAM's U17 and U18. The PROM's may be of the type designated 2732, and the RAM's may be of the type designated 5516.

The microprocessor circuit 50 includes a microprocessor U9 which may be of the type designated 6800. The microprocessor also includes a free-running oscillator 400 which is controlled by a crystal Y1, and which generates a clock signal whose frequency is 4.05504 MHz for precise timing control of the system. The output from the oscillator 400 is applied to a logic circuit including a pair of flip-flops U1A and U1B which serve as frequency dividers, so as to apply a 1 MHz clock signal to "nor" gates U3A and U3B. Flip-flops U1A and U1B may be of the type designated 74LS74. The "nor" gates are connected to appropriate logic circuitry which generates two non-overlapping 1 MHz clock signals M$\phi$1 and M$\phi$2, and which applies these clock signals to microprocessor U9 to fulfill the timing requirements of the microprocessor.

Deadman logic circuitry is also included in FIG. 4 which immediately closes down the microprocessor U9 in the event that the microprocessor malfunctions. The deadman logic includes a free-running oscillator associated with integrated circuit U21 which may be of the type designated LM555. The free-running oscillator produces clock pulses to a logic circuit composed of inverters U23A, U23B and gates U24A and U24B, the outputs of which are applied to an up/down counter U25 of the type designated 74LS193. The inverters may be of the type designated L504, and the gates may be of the type designated L500.

During normal operation of the system, up/down counter U25 is always counting. Under the control of signals UPCNT and $\overline{\text{UPCNT}}$ from the microprocessor circuit, counter U25 counts up a predetermined number of steps, and then counts down a predetermined number of steps, on a cyclic basis, during the operation of the system. Should the microprocessor malfunction, the counter U25 will either count up or count down to an overflow condition. In either instance, gate U24 will activate flip-flops U22A and U22B to set flip-flop U22B.

So long as the up/down counter generates the appropriate outputs TYMOUTA, TYMOUTB, TYMOUTC, and TYMOUTD the microprocessor circuit 50 (FIG. 6) responds to these outputs to generate the appropriate UPCNT signal to prevent the overflow conditions of counter U25 during normal operation of the system.

The RESET output from flip-flop U22B will immediately close down the microprocessor U9, but will permit it to start up again automatically, should the malfunction clear itself. The flip-flops U22A and U22B also respond to a low power condition signal ($\overline{\text{PWRLOW}}$), such as when the system is turned off, or first turned on, which holds the microprocessor U9 in an operative condition, until full power has been achieved.

Microprocessor U9 is also connected to a logic circuit which includes "nor" gates U6, and which generate WRITE ENABLE and READ ENABLE signals when the microprocessor is in corresponding write or read modes.

The A15 bit from the microprocessor U9 is used for test purposes. The test mode is initiated whenever the A15 bit is a "1". Inverter U23A provides the output $\overline{\text{A15X}}$ to initiate the test mode, whereas the circuitry of inverter U23B produces output A15Y to prevent the RAM's U17 and U18 from being addressed by other portions of the system during the test and diagnostic mode.

The system of FIG. 4 also includes decoders U10 and U12 which may be of the type designated 74LS138. The decoder U10 responds to selected address signals from the microprocessor to select the various RAM's and PROM's. Decoder U12 responds to certain address signals from the microprocessor to initiate certain functions, as indicated.

The system of FIG. 4 also includes a power on/off detection circuit composed of transistors Q1, Q2, Q3 and Q4. Transistor Q1 may be a PNP transistor of the type designated MJE170, and transistors Q2, Q3, Q4 may be NPN transistors of the type designated 2N3N04. Whenever the voltage level falls below a predetermined level, the circuit of transistors Q3 and Q4 respond in causing signal $\overline{\text{PWRLOW}}$ to go high. This signal is applied to the RAM's U17 and U18 through logic circuits including inverters U23 and "nor" gates U35, so that when the RAM's U17 or U18 are selected by the decoder U10, the RAM's are blocked by the "nor" gates U35 should the power be below a predetermined level, such as when the system is turned off and first turned on.

A battery B1 is included in the circuit of transistors Q1 and Q2, and this battery supplies power to the RAM's U17 and U18 when the voltage to the system falls below the predetermined minimum. This battery prevents any data stored in the RAM's from being erased, under these conditions, and when the RAM's are blocked, as described above. Battery B1 may be a 3-volt battery of the typ marketed by the General Electric Company and designated by them as CR-2N.

The alphanumeric display 2, key pad 1, key pad interface circuitry 53, and communications port 60 and associated interface of the control unit 10 of FIG. 1A are shown in logic circuit form in FIG. 5.

The various keys S1–S36 of key pad 1 are connected to an output port U8 of the type designated 8279-5 in the key pad interface circuitry 53 at pins designated RL0–RL7. Output port &i converts the key pad outputs into digital signals for application to the data bus. The port U8 also supplies outputs SL0, SL1 and SL2 to a decoder U11 which is connected to selection lines Y0–Y4 of the various keys. The output port U8 continuously services the key pad by providing the selective outputs SL0, SL1 and SL2 which, in turn, select the various columns of keys, as mentioned above through decoder U11. As each key is activated, a signal corresponding to that key is stored in a buffer contained in the port U8. The microprocessor U9 initially addresses the port U8 by address signal A0 to determine whether any key has been operated. Then, if a key has been operated, the corresponding signal in the buffer will cause a corresponding binary coded digital signal D0–D7 to be output from the integrated circuit to the microprocessor, when the integrated circuit is subsequently addressed by the microprocessor by address signal $\overline{\text{A8}}$.

The display unit 1 is addressed by the microprocessor by appropriate address signals A2, A3, A4, A8 applied to decoder U4. The display includes a number of units DS1-DS8, each containing four alphanumeric characters, and each being of the type presently designated DL1414. Each of the units is selected by decoder U4 in response to appropriate address signals from the microprocessor, a particular character of the four characters in the selected unit is selected by appropriate address signals A0–A1. Then, the selected character of the selected unit is illuminated in the corresponding alpha or numeric character by the appropriate data signals D0–D6 supplied to the units by the microprocessor. Capacitors C68–C76 serve as a noise filter.

The communications port is connected to appropriate peripheral equipment, as mentioned above, and the port includes circuitry for providing two standard voltage levels for the peripheral equipment. The communications interface also includes an integrated circuit U34 of the type designated 6850 which serves to transform the analog inputs from the peripheral equipment into corresponding digital signals D0–D7 for the microprocessor, or to transform the digital signals from the microprocessor into appropriate analog signals for controlling the peripheral equipment.

Figure 6:
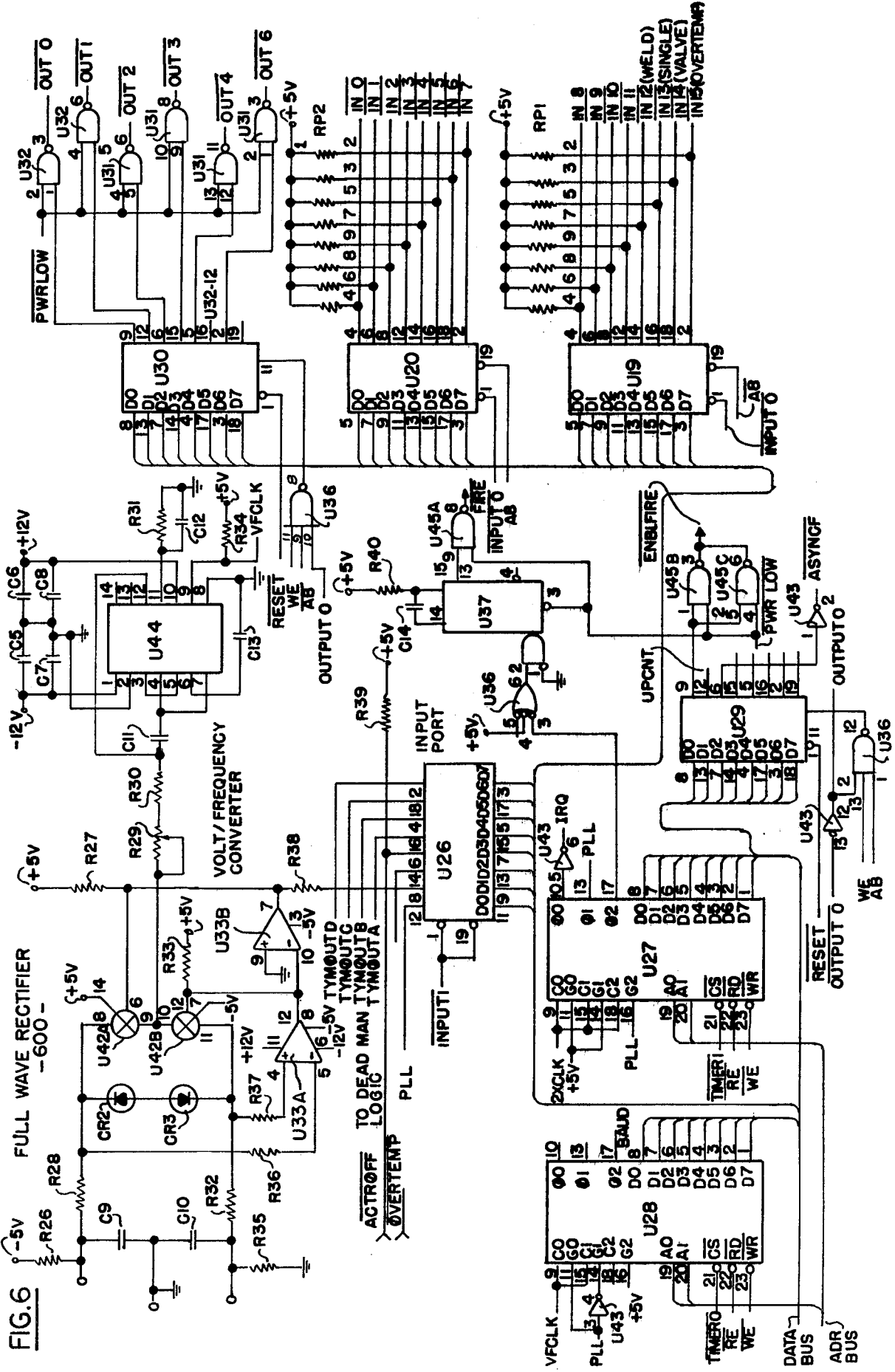

The circuit of FIG. 6 is included in the microprocessor circuit 50 of FIG. 1A, and it provides for constant tip temperature of the controlled welding machine, despite variations in the line voltage. The circuitry includes a precise phase angle power control regardless of changes in line voltage or line noise disturbances. The circuit is similar to the circuit described in U.S. Pat. No. 4,301,351 referred to above. The circuit includes two integrated circuit counter/timers U27, U28, each of which is an Intel type 8253 programmable integrated circuit. These integrated circuits each contain a set of three independent counters which are used as timers. All operations of each of the integrated circuits U27 and U28 are programmable. The microprocessor U9 preloads the counters in each integrated circuit U27 and U28 by way of the data bus. The timers cause the firing time of the welding operation to change to compensate for line voltage variations and disturbances, as fully described in U.S. Pat. No. 4,301,351.

The circuit of FIG. 6 also includes a precision full-wave rectifier circuit 600 which is connected to a reference transformer (not shown). The reference transformer is connected across the leads supplying line voltage to the controlled welding machine. The rectifier 600 produces a full-wave rectified, unfiltered output to a voltage-to-frequency converter chip U44 which may be of the type designated RC4158. The chip U44 produces a series of clock pulses (VFCLK) which are frequency modulated by the absolute RMS voltage from rectifier 600 which, in turn, is scaled to the welding line voltage.

In the precision full-wave rectifier circuit 600, the elements U42A and U42B represent bilateral field effect transistor (FET) switches of the type designated CR4066. The FET switches are connected to the reference transformer, and are controlled by comparators U33A and U33B which may be of the type designated LM319, and which are connected as inverters. The frequency modulated clock VFCLK is applied to integrated circuit U28.

The integrated circuit U27 provides an interrupt signal $\overline{IRQ}$ for the microprocessor, as described in U.S. Pat. No. 4,301,351. The counter also provides the firing pulse for the silicon controlled rectifiers in the contactor unit 12 of FIG. 1A. This is achieved by supplying the output Q2 by way of pin 17 to a gate U36 which triggers a one-shot U37 for pulse stretching purposes, since the silicon controlled rectifiers require pulses of a particular width. One-shot U37 may be of the type designated 74LS123. Its output is applied to a "nor" gate U45A, and the output of the "nor" gate supplies the firing signal $\overline{FIRE}$ to the contactor unit. The signal $\overline{PRLOW}$ is also applied to the "nor" gate, to assure that no firing signal will be supplied to the contactor unit unless the energizing voltage for the system is above a predetermined minimum after turn-on.

The circuit of FIG. 6 also includes an output port comprising integrated circuit U29 which may be of the type designated 74LS273. Output pin 9 of integrated circuit U29 is connected to a pair of "nor" gates U45B and U45C to provide a signal $\overline{ENBLFIRE}$ to the contactor unit. This assures that, even in the presence of a $\overline{FIRE}$ signal, the contactor unit will not fire unless the microprocessor circuit indicates that conditions are such that the SCR's may be triggered. The "nor" gates U45B and U45C also assure that the $\overline{ENBLFIRE}$ signal will not be introduced to the contactor unit unless the exciting voltage of the system is above the predetermined level.

The outputs TYMOUTA-TYMOUTD from the deadman logic circuitry of FIG. 4 are applied to an input port U26 in FIG. 6 which is an integrated circuit of the type designated 81L595. The input port provides corresponding multi-bit digital signals on the data bus, and these signals are sensed by output port U29 so long as the microprocessor U9 is functioning properly, and this latter port produces signal UPCNT at pin 12 in response thereto. This signal serves to reverse the direction of counting of counter U25 in the deadman logic circuit of FIG. 4 whenever the digital signals reach predetermined outer limits. In this way, the counter U25 is caused to count up to a predetermined count, and to count down to a predetermined count, under the control of the UPCNT signal, so long as the microprocessor is operating properly. Port U29 is also connected to "nor" gate U45B to control the $\overline{ENBLFIRE}$ signal to prevent firing of the contactor switches should the deadman logic circuit indicate that a malfunction has occurred.

The circuit of FIG. 6 also includes a port U30 of the type designated 74LS273 which responds to digital data on the data bus (D0–D7) to produce corresponding outputs designated $\overline{OUT0}$–$\overline{OUT6}$ for effectuating the various mechanical controls on the controlled welding equipment. The outputs from port U30 are passed through "nor" gates U31 and U32, and the $\overline{PWRLOW}$ signal is also applied to the gates, so that the various outputs occur only when the exciting voltage to the system is above the predetermined minimum value. This prevents any outputs from being effectuated when the system is first turned on, until the proper power levels have been achieved.

The circuit of FIG. 6 also includes two input ports designated U19 and U20, each of which may be of the type designated 81LS95. These ports respond to various signals derived from the controlled welding equipment, to convert the inputs into corresponding multi-digit binary signals on the data bus, so that various monitoring functions may be carried out.

Figure 7:
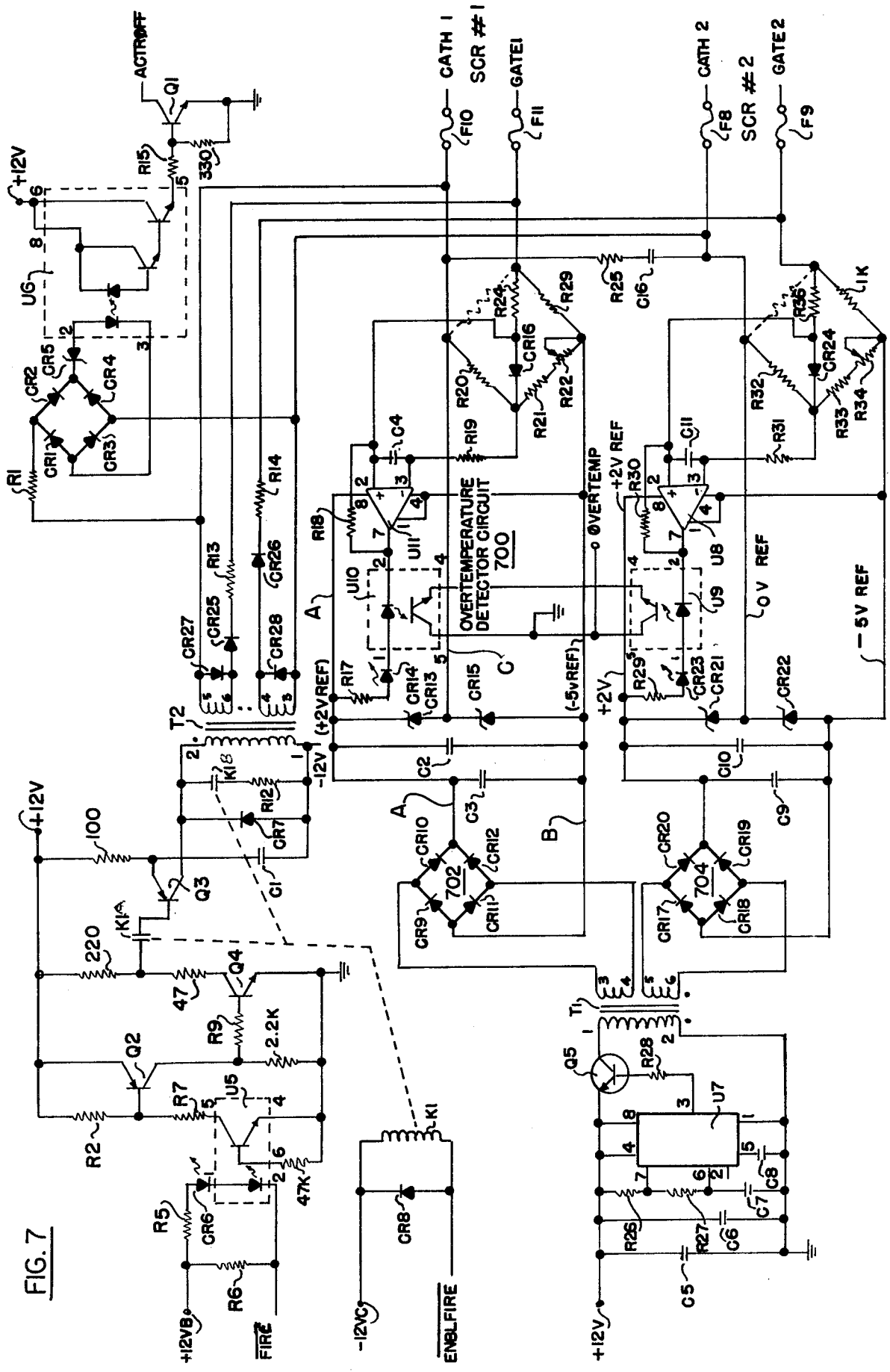
FIG. 7 is a circuit diagram of the portion of the system which is included in the contactor unit of FIG. 1.

The contactor interface circuit is shown in FIG. 7. The circuit includes an amplifier made up of the circuitry of transistors Q2, Q3 and Q4, which is connected to the primary of a transformer T2. The amplifier circuit is coupled back to an input circuit through an opto-isolator U5, and the input circuit responds to the fire signal (FIRE) from the circuitry of FIG. 6 to cause corresponding voltages to be induced across the secondary windings of transformer T2 which, in turn, are applied respectively between the gate and cathodes of two SCR's No. 1 and No. 2 (not shown).

A circuit including a diode bridge CR1-CR4, and an opto-isolator U6 measures the voltage across the cathode and gate electrodes of the SCR's, to control the conductivity of transistor Q1 to develop a signal ACTROFF which detects any failure of the SCR's to file, or any short-circuits in the SCR's.

The circuitry of FIG. 7 also includes a relay K1 which responds to the ENBLFIRE signal from the circuit of FIG. 6, so that a normally-open relay contact K1 is closed only in the presence of the ENBLFIRE signal, and the firing circuit is inactive until that signal is received. The relay K1 also has a normally closed contact K1B which prevents noise signals from cusing spurious firing of the SCR's in the absence of the ENBLFIRE signal.

The circuit of FIG. 7 also includes an over-temperature circuit 700 which responds to any over-temperature in either of the SCR's to produce an over-temperature indicating signal OVERTEMP. The over-temperature detector circuit is of the same type described and claimed in U.S. Pat. No. 4,251,764 which issued Feb. 17, 1981 in the name of James Kirk Mathews, and which is assigned to the present assignee. As described in the patent, the heat detector circuit includes an inverter circuit for transforming a direct current voltage from a 12 volt source into an alternating current voltage. The inverter includes an integrated circuit U7 of the type designated LM555. The integrated circuit is connected as an oscillator.

Specifically, pin 4 of the integrated circuit is connected directly to the positive terminal of the 12 volt source, and pin 7 is connected through a 1 kilo-ohm resistor R26 to the positive terminal of that source. Pin 8 is also directly connected to the positive terminal. The negative terminal of the source is grounded. Pin 7 is connected to pins 2 and 6 through a 22 kilo-ohm resistor R27, and these latter pins are connected to a grounded 0.001 microfarad capacitor C7. A 6.8 microfarad capacitor C5, and a 0.1 microfarad capacitor C6 are connected between the +12 volt positive terminal and ground.

Pin 1 of integrated circuit U7 is grounded, and pin 5 is connected to a grounded 0.1 microfarad capacitor C8. Pins 4 and 8 are connected to the emitter of a PNP transistor Q5 which may be of the type designated MJE170. The base of the transistor is connected to pin 3 of integrated circuit U7 through a 330 ohm resistor R18. The primary of transformer T1 is connected to the collector of transistor Q2 and to ground.

Transistor Q2 acts as a chopper in the inverter circuit so that the +12 volt direct voltage may be transformed into alternating current voltages across the first and second secondary windings of transformer T1. The first secondary winding is connected to a full-wave rectifier 702 made up of diodes CR9-CR12, and the second secondary winding is connected to a full-wave rectifier 704, made up of diodes CR17-CR20. These full-wave rectifiers are floating. The two full-wave rectifiers 702 and 704 are included in identical circuits, one of which is used in conjunction with SCR No. 1, and the other of which is used in conjunction with SCR No. 102, so that only one of these circuits, and specifically the one associated with SCR No. 1 will be described.

Full-wave rectifier 702 is connected between leads A and B, lead A being connected to a floating lead C through a Zener diode CR13. Lead A is designated (+2 V ref), lead B is designated (−5 V ref), and lead C is designated (0 V ref). The Zener diode may be of the type designated IN5221, and it serves as a regulator. A capacitor C5 of 0.1 microfarads and a capacitor C2 of 6.8 microfarads are connected between the leads A and B. The full-wave rectifier 702 establishes, for example, −5 volts direct current on lead B, relative to the floating lead C. Lead C is connected through a 1 amp fuse F10s to the cathode of SCR No. 1, together with the output terminal L1 of the secondary winding of power transformer T2. The other side of the secondary of power transformer T2 (L2) is connected to the gate of the SCR No. 1 through a 1 amp fuse F11.

The full-wave rectifier 100 establishes lead A at +2 volts with respect to floating lead C, as regulated by the Zener diode CR5. Lead A is connected through a 100 ohm resistor R17 and through a light emitting diode (LED) CR14 to an opto-isolator U10. The LED CR14 is used to indicate that the temperature of the junction of SCR No. 1 is below the critical threshold. Opto-isolator U1 may be of the type designated H11A1.

Pin 2 of opto-isolator U1 is connected to the output of an operational amplifier U11. Pins 1 and 4 of the operational amplifier are connected to the −5 volt lead B, and pin 8 is connected to the +2 volt lead A. The positive input of the operational amplifier U2 is connected through a 100 kilo-ohm resistor R18 to the output terminal. A 0.1 microfarad capacitor C4 is connected across the positive and negative input terminals of operational amplifier U11. The operational amplifier U11 may be of the type designated LM311. Its inputs are connected to the cathode and gate of SCR No. 1 through the illustrated resistor network, which includes a 10 kilo-ohm resistor R19, a 180 ohm resistor R20, a 1 kilo-ohm resistor R29, a 10 kilo-ohm variable resistor R22, and a 1 kilo-ohm resistor R21, as well as a 180 ohm resistor R24, and diode CR16. Lead C is also connected to the corresponding lead in the circuit associated with SCR No. 2 through a 20 ohm resistor R25 and 1 microfarad capacitor C16.

The opto-isolator U10 in the circuit associated with full-wave rectifier 702, and opto-isolator U9 in the circuit associated with full-wave rectifier 704, are connected in series, and produce the OVERTEMP signal which is used to cause the controller to terminate introducing firing pulses to the transformer T2 whenever that signal indicates an excessive temperature is being encountered in one of the SCR's.

The resistors connected to the inputs of operational amplifier U11 form a bridge with the junction resistance of SCR No. 1, that resistance being indicated by the broken resistance lines. As described in U.S. Pat. No. 4,251,746, at the outset, the value of variable resistor R22 is adjusted so that under normal conditions, the bridge is unbalanced and current flows through operational amplifier U11 which causes LED CR14 to be illuminated, so as to indicate that the temperature of the junction of SCR No. 1 is below the critical threshold.

Now, should the junction temperature of the SCR No. 1 rise to the critical temperature, the bridge will become balanced, and no current will flow through operational amplifier U11. This will cause LED CR14 to be de-energized, and opto-isolator U10 will also cease to pass current, causing the $\overline{\text{OVERTEMP}}$ signal to go high which, in turn, causes the controller to stop introducing firing pulses to the power transformer T2. The circuit associated with full-wave rectifier 704 performs the same function as the circuit described above, should the junction temperature of SCR No. 2 exceed the critical threshold.

The invention provides a precision microprocessor controlled welding machine controller which is easy to operate, and which performs all of the functions of the controller described in U.S. Pat. No. 4,301,351 with smaller and less complicated equipment.

Although a particular embodiment of the invention has been shown and described, modifications may be made, and it is intended in the claims to cover all modifications which come within the true spirit and scope of the invention.

What is claimed is:

1. A system energized by a source of line voltage for controlling resistance-type welding machine, or the like, comprising: a microprocessor for controlling weld operations of the welding machine; programmable read only memory means connected to said microprocessor and containing pre-programmed instructions for said microprocessor; random access memory means connected to said microprocessor containing pre-programmed weld schedules for the microprocessor; a manually operable key pad; interface circuitry connecting said key pad to said microprocessor to permit user data to be entered into said random access memory means to modify said pre-programmed weld schedules; an alphanumeric display system connected to said microprocessor for displaying operational data including data entered into said random access memory means by said key pad and existing weld programs stored in said random access memory means; contactor circuitry for controlling solid state switching devices connecting the source of line voltage to the welding machine; output circuitry connected to said microprocessor for supplying a fire control signal to said contactor circuitry; logic circuitry connected to said microprocessor including a clock pulse generator and an up/down counter connected to said generator for counting clock pulses therefrom; a first port connecting said counter to said microprocessor; a second port connected to said microprocessor for producing a command signal for said counter to reverse the operation of said counter after a predetermined count so long as the microprocessor is operational; and circuitry connected to said counter for producing a disabling control signal for the microprocessor in the event the predetermined count is exceeded by said counter in either direction.

2. A system energized by a source of line voltage for controlling a resistance-type welding machine, or the like, comprising: a microprocessor for controlling weld operations of the welding machine; programmable read only memory means connected to said microprocessor and containing pre-programmed instructions for said microprocessor; random access memory means connected to said microprocessor containing pre-programmed weld schedules for the microprocessor; a manually operable key pad; interface circuitry connecting said key pad to said microprocessor to permit user data to be entered into said random access memory means to modify said pre-programmed weld schedules; an alphanumeric display system connected to said microprocessor for displaying operational data including data entered into said random access memory means by said key pad and existing weld programs stored in said random access memory means; contactor circuitry for controlling solid state switching devices connecting the source of line voltage to the welding machine; output circuitry connected to said microprocessor for supplying a fire control signal to said contactor circuitry, and which includes power-low circuitry for producing a command signal when the power applied to the system falls below a predetermined level; logic circuitry connected to said power-low circuitry and to said random access memory means to block the flow of data into said random access memory means when the power is below said predetermined level; a battery circuit included in said power-low circuitry to supply power to said random access memory means whn the power supply to said system is below said predetermined level so as to prevent the erasure of data in said random access memory means under such conditions; and in which said output circuitry includes an enable circuit for blocking the application of said fire control signal to said contactor circuitry; and a control circuit connected to said power-low circuitry for activating said enable circuit when the power supply to the system falls below said predetermined level.

3. A system energized by a source of line voltage for controlling a resistance-type welding machine, or the like, comprising: a microprocessor for controlling weld operations of the welding machine; programmable read only memory means connected to said microprocessor and containing pre-programmed instructions for said microprocessor; random access memory means connected to said microprocessor containing pre-programmed weld schedules for the microprocessor; a manually operable key pad; interface circuitry connecting said key pad to said microprocessor to permit user data to be entered into said random access memory means to modify said pre-programmed weld schedules; an alphanumeric display system connected to said microprocessor for displaying operational data including data entered into said random access memory means by said key pad and existing weld programs stored in said random access memory means; contactor circuitry for controlling solid state switching devices connecting the source of line voltage to the welding machine; output circuitry connected to said microprocessor for supplying a fire control signal to said contactor circuitry, in which said key pad interface circuitry includes a port connected to the keys of said key pad and to said microprocessor, said port including a buffer for storing corresponding signals as the individual keys of the key pad are operated, and said port further including circuitry responsive to a first selected address signal from said microprocessor to indicate that at least one key signal is stored in said buffer, and responsive to a second address signal from the microprocessor for producing a binary coded digital signal corresponding to the operated key, and decoding circuitry connected to said port and responsive to predetermined binary coded outputs therefrom for selectively activating the keys of said pad.

* * * * *